United States Patent
Rochefort

[15] 3,691,321
[45] Sept. 12, 1972

[54] POWER DISTRIBUTING SYSTEM
[72] Inventor: Joseph J. F. Rochefort, Montreal, Quebec, Canada
[73] Assignee: Quebec Cartier Mining Company
[22] Filed: April 14, 1971
[21] Appl. No.: 133,987

[52] U.S. Cl..............191/44.1, 174/94 S, 174/99 B, 191/44, 238/14.05
[51] Int. Cl. ...................................B60m 1/24
[58] Field of Search...191/44.1, 44, 40, 42, 43, 33 R, 191/30, 32, 59.1; 174/94 S, 99 B; 339/22 B, 22 T, 21 R, 21 S; 238/14.05, 14.13, 14.14, 14.4, 14.5, 14.2

[56] References Cited
UNITED STATES PATENTS
2,831,071   4/1958   Taylor.....................191/44.1
2,933,567   4/1960   Mageach....................191/40
2,990,458   6/1961   Mageoch..................191/44.1

Primary Examiner—Robert J. Spar
Attorney—Martin J. Carroll

[57] ABSTRACT

A power distributing system includes two bus bars arranged end to end and connected by means of an inverted U-shaped bracket. Holes in the bus bars are aligned with holes in the webs or legs of the bracket and a shear pin extends through each set of aligned holes. A contact conductor plate rests on a smooth conducting surface at the end of each bus bar and is urged against the smooth surface by means of a spring extending between the bottom of the top of the bracket and the top of a pressure plate resting on the contact plate. A bolt welded to the pressure plate extends through the top of the bracket and has a nut threaded on its top.

10 Claims, 5 Drawing Figures

PATENTED SEP 12 1972

INVENTOR
JOSEPH J. F. ROCHEFORT

By Martin J. Carroll
Attorney

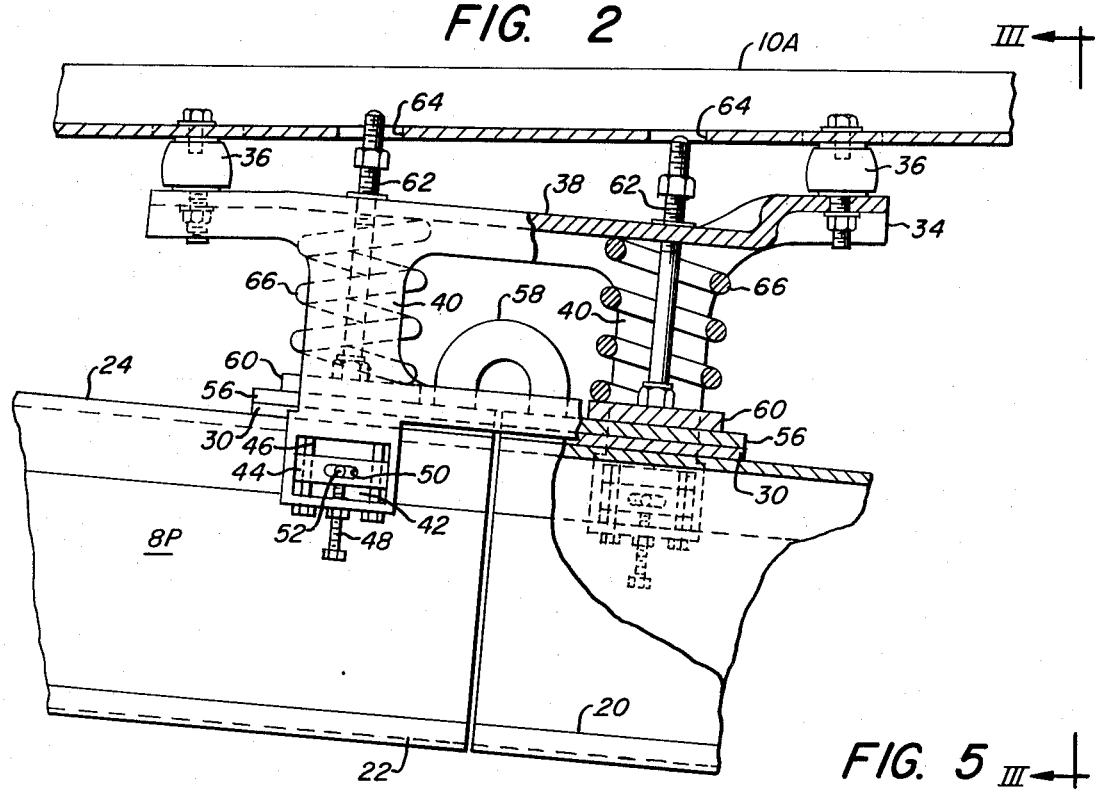
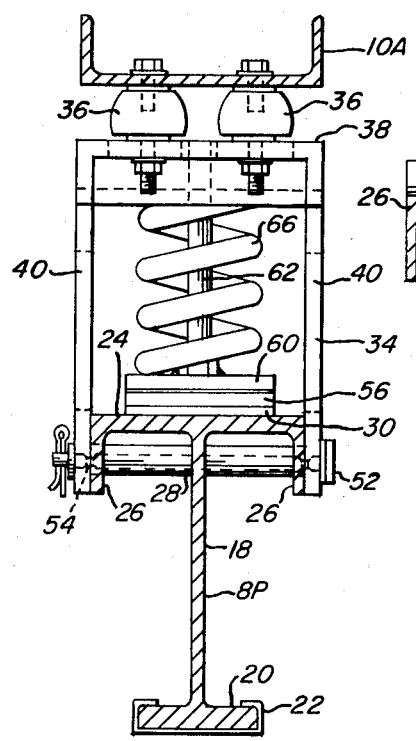
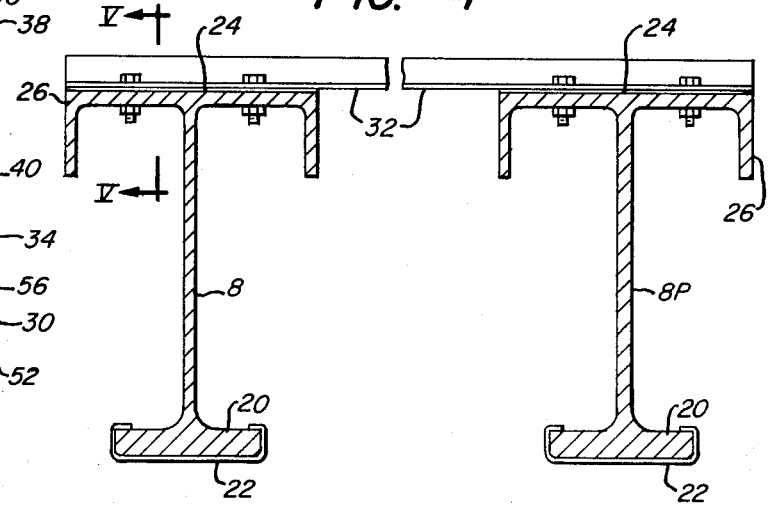

POWER DISTRIBUTING SYSTEM

This invention relates to a power distributing system and more particularly to such a system for use with electric powered trucks employed in open pit mining of iron ore or the like. Such trucks have Diesel electric motor generator sets which supply sufficient power when traveling on the level. However, when traveling up the grade from the bottom to the top of the pit the power is not sufficient to move the truck at relatively high speed. Since such trucks may cost as much as a quarter of a million dollars it is important that they move as rapidly as possible. For that reason it has been suggested to supply power from bus bars to a truck trolley to move the trucks from the bottom of the pits. This also creates problems since the bus bars and their supports are subject to damage from various causes, particularly from blasted rocks flying through the air. It is also necessary to remove the bus bars from time to time during the mining operation and to replace them. The power distributing systems of which I have knowledge or which have been suggested are not satisfactory because they are easily damaged and/or the bus bars are difficult to remove and replace.

It is therefore an object of my invention to provide a power distributing system in which the bus bars and supports therefor are protected from damage.

Another object is to provide such a system in which the bus bars can be easily and rapidly removed and replaced.

These and other objects will be more apparent after referring to the following specification and attached drawings, in which:

FIG. 2 is an elevation, partly in section, of a bus bar and its support;

FIG. 3 is a view taken on the line III—III of FIG. 2;

FIG. 4 is a view taken on the line IV—IV of FIG. 1; and

FIG. 5 is a view taken on the line V—V of FIG. 4.

Figure 1:
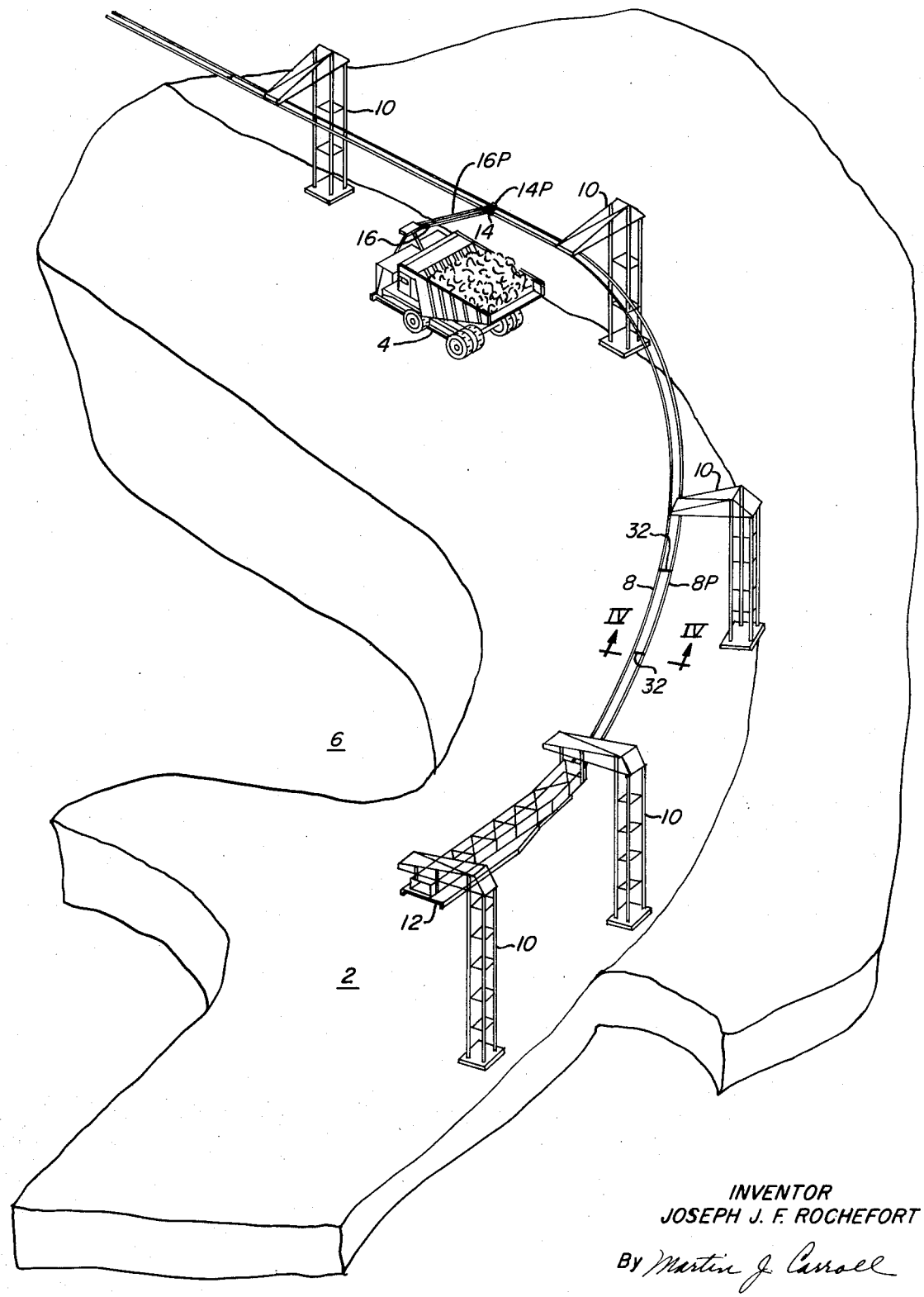
FIG. 1 is a perspective view showing my power distributing system installed in an iron ore pit.

Referring more particularly to FIG. 1 of the drawings, reference numeral 2 indicates a roadway over which a truck 4 travels from the pit mining area 6 upwardly to the top of the pit. The truck 4 is powered by means of an electric motor (not shown). Power is supplied to the motor either by a generator (not shown) mounted on the truck or from bus bars 8 and 8P supported on towers 10 which are spaced apart a distance of 40 feet in one particular installation. The bus bar 8 is at ground potential and bus bar 8P at the required voltage above ground. An entrance guide pan 12 is preferably supported by the two lower towers 10 so as to guide contact shoes 14 and 14P at the end of truck contact arms 16 and 16P into engagement with bus bars 8 and 8P.

According to my invention the bus bars 8 and 8P have the same construction and are supported in the same manner so that only the construction and support for bus bar 8P will be described in detail. The bus bar 8P is made of aluminum and has a vertical web 18, a horizontal bottom flange 20 with its bottom and sides covered with a stainless steel cap 22, and a horizontal top flange 24 with a downwardly extending flange 26 at each end. A galvanized steel bushing 28 passes through and has a press fit with aligned holes in the web 18 and flanges 26 adjacent each end of the bus bar 8P. A copper contact plate 30 preferably plated with cadmium or other non-oxidizing good electrical conductor is secured to the top of flange 24 at each end of bus bar 8P such as by bolts or welding. In the alternative, the top of flange 24 at these locations may be plated with a good electrical conductor. Insulating channels 32 may be provided between bus bars 8 and 8p at spaced points between towers 10 to act as stiffeners against wind load. These stiffeners may be made of "GLASTIC" or other insulating material of such strength that they will readily break under a bending load.

The ends of bus bars 8 are supported from arms 10A of towers 10 as best shown in FIGS. 2 and 3. For this purpose an inverted U-shaped supporting bracket 34 is secured to arm 10A by means of insulators 36. The insulators 36 are omitted when supporting the ground bus bar. The bracket 34 includes a top 38 and downwardly extending webs 40 which are spaced apart a distance slightly greater than the width of top flange 24. Each web 40 has a pair of rectangular openings 42 adjacent the bottom, one on each side of the abutting ends of bus bar 8P. A block 44 is mounted in each opening 42 for vertical sliding movement on pins 46. The positions of blocks 44 may be adjusted by means of a bolt 48 so as to permit good alignment between the adjacent ends of the bus bars 8P. A longitudinal slot 50 is provided in each block 44 for receiving a shear pin 52 having reduced diameter portions 54 in the planes of the outside of top flange 24. It will be understood that the bushings 28 and/or openings 42 with blocks 44 may be omitted and the shear pin supported by non-adjustable aligned holes in web 18, flanges 26 and webs 40. A top contact plate 56 made of copper or other good electrical conductor is mounted on top of each plate 30 and the two plates 56 are electrically connected by a flexible conductor 58 made of stranded copper wires. A steel pressure plate 60 having a bolt 62 welded thereto rests on each plate 56 with the bolt 62 passing upwardly through top 38 of the bracket 34. Holes 64 are provided in arm 10A when necessary to give clearance for bolts 62. A spring 66 surrounding bolt 62 bears against the bottom of top 38 and the top of plate 60 to hold plates 30 and 56 in good contact so as to permit flow of current from one bus bar 8P to the adjacent bus bar 8P through flexible conductors 58.

In operation, a loaded truck 4 is driven under its own power from mining area 6 to the entrance guide 12 and moved until its contact shoes 14 and 14P contact bus bars 8 and 8P. Power is then applied from the bus bars 8 and 8P until the truck 4 reaches the top of the pit. When a section of the bus bar is struck by a piece of blasted rock or is subjected to any other type of load which is sufficient to damage the bus bars or supports the shear pin 52 will break and the bus bar will fall to the ground without having transmitted sufficient force to damage the tower or support. The broken pin is then easily removed. When it is desired to replace a section of the bus bar the spring 66 is compressed by turning the nut on bolt 62 to remove downward pressure on the bus bar and the pin 52 then removed. The end of a new bus bar or the old one, if being replaced, is then brought into alignment with the adjacent bus bar and with the slots 50 and a shear pin 52 inserted. The nut is then loosened to permit the spring 66 to urge plate 56 into tight engagement with plate 30. Thus, little time is lost in repair or replacement of parts.

While one embodiment of my invention has been shown and described, it will be apparent that other adaptations and modifications may be made without departing from the scope of the following claims.

I claim:

1. A power distribution system comprising a main support; an inverted U-shaped bracket attached to said main support having two spaced apart downwardly extending webs, each of said webs having a pair of horizontally spaced holes therein adjacent their bottoms with the holes in one web being aligned with the holes in the other web, a pair of bus bars arranged end to end with their adjacent ends between said holes, each of said bus bars having a top flange with a width substantially equal to the distance between said bracket webs, and a downwardly extending flange attached to the outer end of said top flange, said vertical flanges of each bus bar having holes therein in alignment with the aligned holes in said bracket, a pin extending through each set of aligned holes, each bus bar having a smooth electrical conducting top surface at its said adjacent end, a top contact conductor plate resting on each of said conducting top surfaces, means urging each of said top contact plates against its associated conducting top surface, and a flexible conductor extending between said top contact plates.

2. A power distribution system according to claim 1 in which each of said pins has a reduced diameter portion adjacent the vertical flanges.

3. A power distribution system according to claim 1 in which the means urging each of said top contact plates against its associated conducting top surface includes a pressure plate resting on each top contact plate, a bolt secured to each pressure plate and extending upwardly through said bracket with a nut threaded thereon above said bracket, and a spring surrounding said bolt and extending between the top of said pressure plate and the bottom of the bracket top.

4. A power distribution system according to claim 3 in which each of said pins has a reduced diameter portion adjacent the vertical flanges.

5. A power distribution system according to claim 1 including a pair of rectangular openings adjacent the bottom of each web in alignment with the openings in the other web; a block mounted in each opening for vertical movement, each of said holes being a horizontal slot in said blocks.

6. A power distribution system according to claim 5 in which the means urging each of said top contact plates against the associated conducting top surface includes a pressures plate resting on each top contact plate, a bolt secured to each pressure plate and extending upwardly through said bracket with a nut threaded thereon above said bracket, and a spring surrounding said bolt and extending between the top of said pressure plate and the bottom of the bracket top.

7. A power distribution system according to claim 1 in which each of said bus bars includes a vertical web and a bottom flange, and a tubular member extending through said web and vertical flanges of each bus bar in alignment with said holes, said pin extending through said tubular member and having a reduced diameter portion adjacent the vertical flanges.

8. A power distribution system according to claim 7 including a pair of rectangular openings adjacent the bottom of each web in alignment with the openings in the other web; a block mounted in each opening for vertical movement, each of said holes being a horizontal slot in said blocks.

9. A power distribution system according to claim 8 in which the means urging each of said top contact plates against its associated conducting top surface includes a pressure plate resting on each top contact plate, a bolt secured to each pressure plate and extending upwardly through said bracket with a nut threaded thereon above said bracket, and a spring surrounding said bolt and extending between the top of said pressure plate and the bottom of the bracket top.

10. A power distribution system according to claim 9 in which said conducting top surface includes a lower contact conductor plate secured to the top flange of each bus bar at their adjacent ends.

* * * * *